United States Patent
Gelfenbeyn et al.

(10) Patent No.: US 10,490,186 B2
(45) Date of Patent: Nov. 26, 2019

(54) PARAMETER COLLECTION AND AUTOMATIC DIALOG GENERATION IN DIALOG SYSTEMS

(71) Applicant: Google LLC, Mountain View, CA (US)

(72) Inventors: Ilya Gennadyevich Gelfenbeyn, Sunnyvale, CA (US); Pavel Aleksandrovich Sirotin, Sunnyvale, CA (US); Artem Goncharuk, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/237,318

(22) Filed: Dec. 31, 2018

(65) Prior Publication Data

US 2019/0139538 A1 May 9, 2019

Related U.S. Application Data

(63) Continuation of application No. 15/331,203, filed on Oct. 21, 2016, now Pat. No. 10,170,106.
(Continued)

(51) Int. Cl.
*G10L 15/00* (2013.01)
*G10L 15/18* (2013.01)
(Continued)

(52) U.S. Cl.
CPC ........ *G10L 15/1815* (2013.01); *G06F 3/0481* (2013.01); *G06F 3/16* (2013.01);
(Continued)

(58) Field of Classification Search
CPC ...................................................... G10L 15/00
(Continued)

(56) References Cited

U.S. PATENT DOCUMENTS 6,868,385 B1 * 3/2005 Gerson ................... G10L 15/30
370/468
6,999,930 B1 * 2/2006 Roberts ................. G10L 15/193
379/88.01
(Continued)

FOREIGN PATENT DOCUMENTS

JP 2008146150 A 6/2008
KR 1020120120316 A 11/2012
(Continued)

OTHER PUBLICATIONS

International Search Report and Written Opinion of PCT Ser. No. PCT/US2016/058193; 9 pages dated Apr. 27, 2017.
(Continued)

*Primary Examiner* — Michael C Colucci
(74) *Attorney, Agent, or Firm* — Middleton Reutlinger

(57) ABSTRACT

Natural speech dialog system and methods are disclosed. In one example, a method includes identifying a dialog system intent associated with the speech input based on at least one predetermined intent keyword, the dialog system intent having required intent parameters, determining whether data for all required intent parameters of the dialog system are available, based on the determination, selectively initiating a parameter collection dialog associated with the dialog system intent, the parameter collection dialog being operable to collect data for the required parameters not otherwise available to the dialog system intent, and based on the dialog system intent and one or more required parameters, generating an action instruction.

15 Claims, 10 Drawing Sheets

Related U.S. Application Data

(60) Provisional application No. 62/244,560, filed on Oct. 21, 2015.

(51) Int. Cl.

| | |
|---|---|
| *G06F 3/0481* | (2013.01) |
| *G06F 3/16* | (2006.01) |
| *G10L 15/08* | (2006.01) |
| *G10L 15/22* | (2006.01) |
| *H04M 3/493* | (2006.01) |
| *G01C 21/36* | (2006.01) |
| *H04M 7/00* | (2006.01) |

(52) U.S. Cl.
CPC ............ *G10L 15/08* (2013.01); *G10L 15/22* (2013.01); *H04M 3/4936* (2013.01); *G01C 21/3608* (2013.01); *G10L 2015/088* (2013.01); *G10L 2015/223* (2013.01); *H04M 7/0012* (2013.01); *H04M 2201/40* (2013.01); *H04M 2203/355* (2013.01)

(58) Field of Classification Search
USPC .......... 704/9, 235, 277, 254, 270.1; 717/138
See application file for complete search history.

(56) References Cited

U.S. PATENT DOCUMENTS

| | | | | |
|---|---|---|---|---|
| 7,228,275 | B1* | 6/2007 | Endo | G10L 15/32 |
| | | | | 704/231 |
| 7,266,537 | B2* | 9/2007 | Jacobsen | G06F 17/2264 |
| | | | | 700/103 |
| 7,647,225 | B2* | 1/2010 | Bennett | G06F 17/3043 |
| | | | | 704/251 |
| 8,024,196 | B1* | 9/2011 | Wodtke | H04M 3/4938 |
| | | | | 379/90.01 |
| 8,311,835 | B2* | 11/2012 | Lecoeuche | H04M 1/72561 |
| | | | | 704/270 |
| 8,332,218 | B2* | 12/2012 | Cross, Jr. | 704/231 |
| 2002/0091528 | A1* | 7/2002 | Daragosh | G10L 15/30 |
| | | | | 704/270.1 |
| 2004/0083092 | A1* | 4/2004 | Valles | G06F 17/271 |
| | | | | 704/9 |
| 2005/0055210 | A1* | 3/2005 | Venkataraman | G10L 15/065 |
| | | | | 704/255 |
| 2005/0203751 | A1* | 9/2005 | Stevens | G10L 15/22 |
| | | | | 704/276 |
| 2008/0082329 | A1* | 4/2008 | Watson | G10L 15/32 |
| | | | | 704/235 |
| 2009/0150156 | A1 | 6/2009 | Kennewick et al. | |
| 2011/0060587 | A1* | 3/2011 | Phillips | G10L 15/30 |
| | | | | 704/235 |
| 2012/0166178 | A1* | 6/2012 | Latzina | G06F 17/27 |
| | | | | 704/9 |
| 2013/0152092 | A1* | 6/2013 | Yadgar | G10L 15/19 |
| | | | | 718/102 |
| 2013/0268260 | A1* | 10/2013 | Lundberg | G06F 17/28 |
| | | | | 704/8 |
| 2014/0297282 | A1* | 10/2014 | Peters | G10L 15/19 |
| | | | | 704/254 |
| 2014/0380285 | A1* | 12/2014 | Gabel | G06N 5/022 |
| | | | | 717/139 |
| 2015/0242385 | A1* | 8/2015 | Bao | G06F 17/2881 |
| | | | | 704/9 |

FOREIGN PATENT DOCUMENTS

| | | |
|---|---|---|
| WO | 2014209157 | 12/2014 |
| WO | 2016040769 | 3/2016 |

OTHER PUBLICATIONS

Japanese Patent Office; Office Action issued in Application No. 2018-520601 dated May 13, 2019.

The Korean Intellectual Property Office; Office Action issued in Application No. 10-2018-7014399 dated Aug. 30, 2019.

The European Patent Office; Examination Report issued in Application No. 16788388.3 dated Sep. 6, 2019.

\* cited by examiner

| Prompts for "city" | | |
|---|---|---|
| NAME | DATA TYPE | VALUE |
| city | @sys.geo-city | $city |

PROMPTS

1. Where are you going?

2. What is the destination?    — 902

3. *Enter new prompt ...*

FIG. 9

PARAMETER COLLECTION AND AUTOMATIC DIALOG GENERATION IN DIALOG SYSTEMS

BACKGROUND

Dialog systems are widely used in applications for portable devices. Typically, a dialog system includes a computer-based agent having a human machine interface for accessing, processing, managing, and delivering information. Dialog systems are also known as chat information systems, spoken dialog systems, conversational agents, chatter robots, chatterbots, chatbots, chat agents, digital personal assistants, automated online assistants, and the like.

Traditionally, a dialog system can interact with a human using a natural language to simulate an intelligent conversation and provide personalized assistance to the user. For example, a user may ask the dialog system "What is the weather like in Alexandria today?" and receive an answer from the dialog system in the form of audio or text messages. The user may provide voice commands to the dialog system to cause performance of certain operations, for example, generating e-mails, making phone calls, searching for information, navigating, setting notifications or reminders, and so forth. These and other functionalities make dialog systems very popular with users, especially with users of portable electronic devices such as, for example, smart phones and tablet computers.

A dialog system can include a dialog system engine responsible for receiving user voice inputs, transforming them into text inputs, interpreting the text inputs, generating appropriate responses to the text inputs, and delivering responses to users. Interpreting inputs and finding proper responses can utilize artificial intelligence algorithms. Thus, despite the growing demand for dialog systems, creating the dialog systems remains a complex engineering task.

SUMMARY

A natural language dialog system can maintain a dialog with a user and provide intelligent responses or perform a wide range of actions in response to user requests. The user requests can be interpreted by the natural language dialog system using dialog system "intents" that facilitate mapping between what a user utters and actions taken by the natural language dialog system. In certain user-machine dialog contexts, in order to implement an action for a given intent, the natural language dialog system needs to obtain one or more intent parameters. For example, when a user requests the natural language dialog system to order a pizza, the natural language dialog system needs to acquire parameters associated the pizza such as a size, a crust type, toppings, a vendor, a time and an address for delivery.

Examples according to the disclosure provide systems and methods for collecting intent parameters from users with a machine-implemented parameter collection dialog imitating a natural language dialog. A predetermined intent of the user may need to be identified in order for the collection of intent parameters to be initiated. Once the intent parameters are collected, the natural language dialog system implements a predetermined action associated with the intent based on the collected parameters (e.g., send an electronic purchase order to a pizza restaurant).

Examples according to the disclosure can further provide systems and methods for enabling software developers to create dialog agents configurable to run parameter collection dialogs and collect intent parameters. In one example disclosed herein, there is provided a method for intent parameter collection includes receiving a speech input of a user; identifying a dialog system intent associated with the speech input based on at least one predetermined intent keyword, the dialog system intent having required intent parameters; determining whether data for all required intent parameters of the dialog system are available; based on the determination, selectively initiating a parameter collection dialog associated with the dialog system intent, the parameter collection dialog being operable to collect data for the required parameters not otherwise available to the dialog system intent; and based on the dialog system intent and one or more required parameters, generating an action instruction.

In one example, the method may further include identifying at least one of the required intent parameters in the speech input and extracting the at least one of the required intent parameters from the speech input. The method can further include extracting the required intent parameters from the speech input without initiating the parameter collection dialog based on the determination that the speech input includes all missing intent parameters. The parameter collection dialog may include at least one predetermined prompt.

In one examples, the method may further include receiving at least one further speech input of the user in response to the at least one predetermined prompt and extracting at least one of the required intent parameters from the at least one additional speech input until all of the missing intent parameters are collected. The intent parameters may include at least one of the following: a numerical value, a word, a phrase, a sound, and an image. The at least one of the intent parameters can selected from a list of predetermined values.

In one example, the method can further include enabling, by a developer platform, a developer to create a dialog agent of the natural speech dialog system to automate collection of missing intent parameters, the dialog agent being associated with a developer profile. The method can further include providing, by the developer platform, a graphical interface to enable the developer to create the dialog agent and provide one or more of the following: the dialog system intent, at least one intent parameter, and one or more prompts for the intent parameters. The method can further include enabling the developer, by the developer platform, to designate a dialog system entity or a data type for the intent parameters and enabling the developer, by the developer platform, to designate a value type for each of the intent parameters. The action instruction can be configured to cause a server or a user device to implement a predetermined action based on the action instruction and one or more required intent parameter. The action instruction can include an Application Programming Interface (API) specific response configured to cause an API service. The method con further include providing a confirmation message allowing the user to confirm or clarify the action instruction, wherein the confirmation message recites one or more required intent parameters.

In another example according to the disclosure, there is provided a natural speech dialog system including at least one processor and a memory storing processor-executable codes. The processor can be configured to implement the following operations upon executing the processor-executable codes: identifying a dialog system intent associated with the speech input based on at least one predetermined intent keyword, the dialog system intent having required intent parameters; determining whether data for all required intent parameters of the dialog system are available; based on the determination, selectively initiating a parameter collection dialog associated with the dialog system intent, the parameter collection dialog being operable to collect data for the required parameters not otherwise available to the dialog system intent; and based on the dialog system intent and one or more required parameters, generating an action instruction.

In one example, the at least one processor can be further configured to retrieve all of missing intent parameters from the speech input without initiating the parameter collection dialog based on the determination that the speech input includes all of the missing intent parameters. The at least one processor can be further configured to generate at least one predetermined prompt for the parameter collection dialog. The at least one processor can be further configured to implement the following operations upon execution of the processor-executable codes: receive at least one additional speech input of the user in response to the at least one predetermined prompt and retrieve at least one of the required intent parameters from the at least one additional speech input until all of the missing intent parameters are collected.

In one example the at least one processor can be configured to implement the following operations upon execution of the processor-executable codes: enable, by a developer platform, a developer to create a dialog agent for the natural speech dialog system to automate collection of the required intent parameters, the dialog agent being associated with a developer profile. The at least one processor can be configured to implement the following operations upon execution of the processor-executable codes: provide, by the developer platform, a graphical interface to: enable the developer to create the dialog agent; and provide at least one of the following: the dialog system intent, at least one intent parameter, and one or more prompts for the parameter collection dialog for each of the intent parameters; enable the developer, by the developer platform, to designate a dialog system entity or a data type for the intent parameters; and enable the developer, by the developer platform, to designate a value type for each of the intent parameters.

In yet another example according to the disclosure, there is provided a non-transitory processor-readable medium having instructions stored thereon, which when executed by one or more processors, can cause the one or more processors to implement a method for a natural speech dialog system. The method can include identifying a dialog system intent associated with the speech input based on at least one predetermined intent keyword, the dialog system intent having required intent parameters; determining whether data for all required intent parameters of the dialog system are available; based on the determination, selectively initiating a parameter collection dialog associated with the dialog system intent, the parameter collection dialog being operable to collect data for the required parameters not otherwise available to the dialog system intent; and based on the dialog system intent and one or more required parameters, generating an action instruction.

This section is not intended to identify key features or essential features of the claimed subject matter, nor is it intended to be used as an aid in determining the scope of the claimed subject matter. The details of one or more examples of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Embodiments are illustrated by way of example and not limitation in the figures of the accompanying drawings, in which like references indicate similar elements.

FIG. 9 shows an example GUI of a platform interface for defining prompts of a dialog agent, according to an example embodiment of the disclosure.

DETAILED DESCRIPTION

Figure 1:
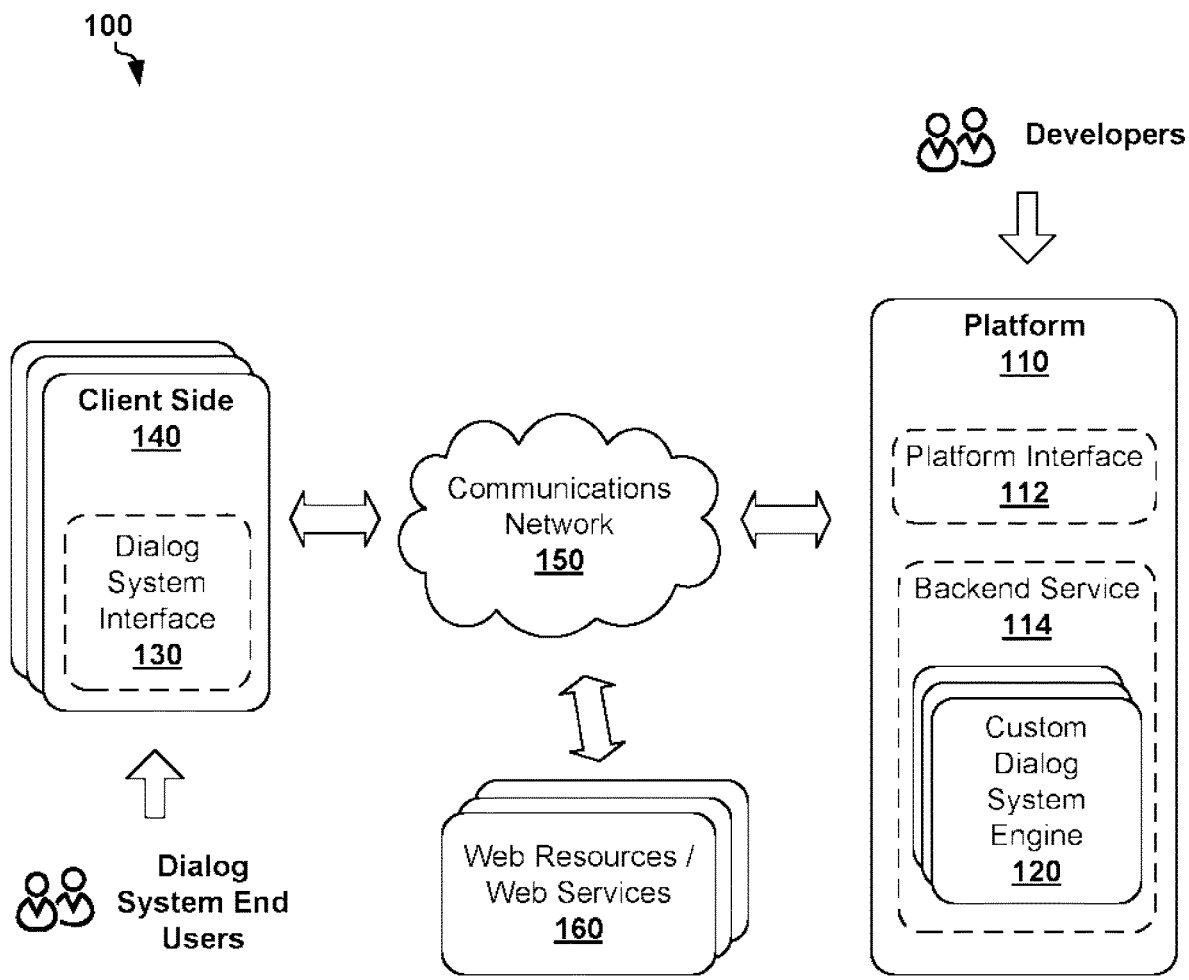
FIG. 1 illustrates an environment within which systems and methods for creating custom dialog system engines for dialog system interfaces can be implemented, in accordance with some embodiments of the disclosure.

Example aspects of the disclosure are generally concerned with natural language dialog systems (also referred to "dialog systems" for simplicity) configured to maintain an intelligent human-machine interaction. The dialog systems can receive speech inputs from users, transform the speech inputs into text inputs, and process the text inputs using machine-learning, statistical, heuristic, or other suitable algorithms. The result of the processing can include a response message for the user or an action performed by a client device or server. Example actions may include sending emails, making reservation, setting notifications or reminders, booking hotels, checking weather forecast, navigating traffic, and so forth.

The human-machine interaction can be based on dialog system intents that can include schemes, rules, or mappings between user inputs and actions to be taken by the dialog system and, in particular, dialog contexts. Dialog system intents can be automatically identified by dialog systems in the course of a human-machine interaction by detecting predetermined keywords or phrases in user inputs. For example, an intent can be identified when a user asks a dialog system to book a hotel in a certain city. In another example, an intent can be identified when a user asks a dialog system to send a text message or an email to a particular addressee. In yet another example, an intent can be identified when a user asks a dialog system to order a pizza from a restaurant.

Processing predetermined dialog system intents can require collecting a wide range of intent parameters. For example, when the intent requires an action of sending a text message to a recipient, the intent parameters required and sufficient to execute this intent, can include content of the text message and name of the recipient. For the example of intent that is provided to book a hotel electronically, the required parameters may include a destination city, a room type, an arrival date, a departure date, and, optionally, other parameters such as a hotel rating, a hotel name, hotel services, and the like. Rather than defining multiple intents and linking them via a dialog context, examples disclosed herein provide for dialog agents for use in dialog systems, so that each dialog agent can be associated with a single dialog system intent and one or more intent parameters of the dialog system intent.

When a particular dialog agent is activated, a parameter collection dialog can be initiated upon detection of dialog system intent in user speech inputs. The parameter collection dialog can detect intent parameters that have been already provided by the user or available from other sources. If it is determined that certain intent parameters are missing, the parameter collection dialog can provide prompt messages to the user to prompt the user to provide additional speech inputs. The prompt messages can be predefined or can be created as needed, and selected to guide the user to provide missing required parameters and in some cases additional optional parameters. The dialog system can retrieve intent parameters from one or more additional speech inputs of the user.

In some examples, some parameters can be obtained from pre-stored data. For example, if the user says, "call a taxi service to give me a ride from where I am to home", the user's home address could be obtained from memory. When at least the minimum of all parameters required for a particular intent are collected or ascertained, the parameter collection is completed and the dialog system can generate an action instruction based on the intent. The action instruction can be based on the intent and some required and optional intent parameters collected from the user speech inputs or obtained elsewhere. The dialog system, a client device, or a server can then execute an action command to provide a dialog response to the user or to perform a certain action.

For example, when a user utters, "Please book a hotel for me in Palo Alto," the dialog system can identify that the dialog system intent is "Hotel Booking" and start a corresponding parameter collection dialog. First, the dialog system can determine that some of the required parameters have been already provided (i.e., the city is Palo Alto) or available from other sources. The dialog system can further determine that other required parameters of the "Hotel Booking" intent, such as an arrival date and a length of stay, are still missing. The dialog system can prompt the user to provide further speech input with prompts such as "When would you like to arrive?" and "How many nights would you be staying?" When the user provides answers, the dialog system can retrieve intent parameters from the inputs and continue to provide prompts until all missing required intent parameters are collected. Furthermore, the dialog system can request the user to confirm that the required parameters are collected by providing a summary output such as, for example, "You want me to book a hotel in Palo Alto for you starting next Monday for two nights. Is that correct?" If the user answers affirmatively, the dialog system can generate an electronic hotel booking order including one or more collected parameters and send it to an appropriate web service. Otherwise, the dialog system can ask the user what needs to be changed or added.

Examples disclosed herein are also concerned with a developer platform enabling software developers to create custom dialog system engines and dialog agents, including dialog agents for collecting intent parameters as described above. Typically, dialog system engines include backend services that cooperate with custom dialog system interfaces. Dialog system interfaces can be implemented at least as part of various software applications, mobile applications, middleware applications, firmware applications, websites, and so forth. In other words, dialog system interfaces can provide computer-human interfaces configured to at least acquire user input and deliver dialog system outputs to the users.

Dialog system engines can support the dialog system interfaces by processing user inputs and generating corresponding responses (or commands). Thus, a dialog system engine and a dialog system interface, when interacting with each other, can form a dialog system. In certain examples, a dialog system interface running on or accessed from a user device can be referred to as a "frontend" user interface, while a dialog system engine, which supports the operation of this dialog system interface, can be referred to as a "backend" service. In some examples, the interface and engine may include a client-server model, with the two in communication via a network connection. In other examples, the dialog system engine and a dialog system interface may operate on a single device, without requiring a networked connection to a server.

A developer platform, according to examples of the present disclosure, can allow software developers to create custom dialog system engines that can support frontend dialog system interfaces. For example, if a software developer wants to integrate a dialog system functionality into a mobile application as an additional feature, the developer can use the platform to create and deploy a custom dialog system engine and link the custom dialog system engine with the mobile application. The mobile application may only include a dialog system interface. In this example, a user can activate the dialog system interface by interacting with the mobile application. The user can make inquiries to the dialog system interface in the form of voice inputs or text inputs. Upon receipt of a user inquiry, the dialog system interface can transmit the inquiry to the linked custom dialog system engine, previously created using the developer platform, with or without additional preprocessing. The custom dialog system engine can process and interpret the received user inquiry and generate a response to the inquiry based on predetermined rules and settings. The response can be then delivered to the dialog system interface for further visual or audio presentation to the user. Alternatively, if the response includes an action instruction (a command), the action instruction can be executed or sent to a server, a web service, or a client device for execution.

Dialog system interfaces can be run by and/or integrated into a wide range of software applications executable by a user device, such as a personal computer or smartphone, or remotely on a server or a computing cloud resource such that the dialog systems are part of a website or a web service. As mentioned, dialog system engines can be implemented on the same user device as the interface, on a companion device in communication with device on which the interface is implemented (such as a mobile phone and smart watch communicating via a Bluetooth connection), or on a server such that their functionalities can be accessible to dialog system interfaces over the Internet, mobile data networks, or any other communications networks.

FIG. 1 shows a high-level block diagram of an example system environment 100 that can be suitable for practicing examples of the present disclosure. Particularly, FIG. 1 shows a platform 110 for creating and maintaining custom dialog system engines. As shown, platform 110 includes a platform interface 112 for creating custom dialog system engines and a backend service 114 for maintaining and running custom dialog system engines 120. In some aspects of the disclosure, platform 110 includes a developer platform.

Platform interface 112 may include a graphical user interface (GUI) embedded into a webpage and accessible by developers via a network. In some other aspects of the disclosure, platform interface 112 can be implemented as a software application, including a downloadable software application or any other software such as, for example, middleware, or firmware running on or accessible from an electronic device such as a computer or a smartphone. In the example shown in FIG. 1, platform interface 112 is carried out as a web accessible GUI (described in more detail below). For simplicity, this disclosure provides only aspects in which platform interface 112 is a server-based solution to be accessible via the Internet. It should be understood, however, that platform interface 112 is not limited to such implementation and can allow creation of one or more custom dialog system engines 120 or dialog agents through a variety of GUI tools.

Still referring to FIG. 1, backend service 114 can be responsible for maintaining and running custom dialog system engines 120 that are created, for example, by or with the help of platform interface 112. Backend service 114 may operate as a web service providing functionality to custom dialog systems by enabling their dialog system interfaces to interact with custom dialog system engines 120 maintained by backend service 114 of platform 110.

As discussed above, a dialog system interface 130 can be provided on a client side 140. The dialog system interface 130 may be a GUI enabling users to make inquiries, which are then delivered to backend service 114 for processing by corresponding dialog system engines 120, and to receive responses to the inquiries generated by dialog system engines 120. The dialog system interface 130 may be implemented as a stand-alone software application or it can be integrated into another software application, web service, website, and the like. It should be understood that a client-server model is illustrated for the purposes of explanation only. The system disclosed herein does not need to be a client-server system, and in certain examples the dialog system interface 130 and dialog system engines 120 can be on the same (e.g., user) device.

Client side 140 may include a user device, a client device, a terminal, a portal, user equipment, a computing device (e.g., laptop computer, tablet computer, desktop computer, workstation, personal computer, and a smartphone), a personal digital assistant, a gaming console, a remote control, a multimedia system, a smart television device, a set-top box, an infotainment system, an in-vehicle computing device, an informational kiosk, a robot, and so forth. In these examples, one or more dialog system interfaces 130 can be implemented as software, middleware, or firmware.

In additional examples, client side 140 may refer to a networked or an online solution such as a server, a web hosting service, a web service, a website, a cloud service, and so forth. For example, dialog system interface 130 can include a widget or a GUI provided on one or more web pages to allow end users to make inquiries and receive responses thereto. This option can be suitable where a developer, for example, wants to integrate a dialog system into a website to provide an enhanced customer service.

As can be seen in FIG. 1, interactions between the dialog system interfaces 130 and corresponding custom dialog system engines 120 are occurring via a communications network 150. Communications network 150 may include one or more of the following: the Internet, an intranet, a mobile data network, a local area network, a wide area network, an IEEE 802.11 based network, a personal area network (e.g., Bluetooth, Zigbee), infrared, and so forth.

FIG. 1 also shows various third party web resources/services 160, which can provide information to custom dialog system engines 120 or dialog system interfaces 130 as part of dialog system responses or perform certain actions or operations. For example, web resources/services 160 may provide email services, weather services, navigation services, hotel booking services, taxi reservation services, online shopping services, e-commerce services, reservation services, reminder services, and the like. Accordingly, if a user says, "What is the weather like today?," corresponding information can be automatically acquired by dialog system engine 120 from one or more third party web resources/services 160 and integrated into a dialog system response to be delivered to the user. If the user says, "Send an email to John to invite him to my party tonight," dialog system engine 120 can cause a third party web resource/service 160 to create an email and send the email to an email address associated with the addressee.

An example process of creating and operating custom dialog system engines 120 will now be described with reference to FIG. 1 and other drawings. In particular, platform interface 112 can provide one or more GUIs having a number of tools enabling developers to create and customize one or more "dialog system elements," which serve as a basis for a custom dialog system engine.

According to various examples, dialog system elements include at least "entities" and "intents." Each entity may include a number of objects having substantially same or similar characteristics. In other words, entities can include lists of keywords defining objects of a class. In one example, an entity may include a keyword and a set of synonyms corresponding to the keyword. In another example, an entity may include a keyword and a set of definitions corresponding to the keyword. In yet another example, an entity may include a list (e.g., a list of cities, a list of names, a list of titles, a list of brands, and a list of street names). In some examples, the entities can be used in a particular dialog agent and depend on parameter values that are expected to be returned as a result of agent's functionality.

In some examples of the disclosure, a developer may not need to create entities for every concept mentioned in the dialog agent—only for those required for actionable data. For example, there can be three types of entities. The first type can include system entities, for example, common date references, time references, number references, and city references. The second type can include developer entities, for example, any unique group of synonyms mapped to a reference value such that a developer can create a food type entity by making an entry with a reference value of "vegetarian" with synonyms of "veg" and "veggie". The third type can include user entities, for example, entities defined for a specific end user such as a playlist entity specific to user preferences. Furthermore, each of these entities can be a mapping (having reference values), an enum type (having no reference values), or a composite (containing other entities with aliases and returning object type values).

In some examples, the list of objects associated with the entity can be extended automatically. For example, a machine-learning algorithm can be used to suggest one or more new objects to be associated with the entity. A machine learned algorithm can be trained using large texts and/or vocabularies. By way of example and not limitation, a developer of custom dialog system engine 120 can define an entity @city with values such as, for example, New York and Los Angeles. If a user of the custom dialog system engine utters or enters words "Washington, D.C.", then the entity @city can be automatically extended to New York, Los Angeles, and Washington D.C. because the machine-learning algorithm can determine that "Washington D.C." is related to objects listed in the entity @city. In some examples, a user can be asked to confirm that the suggested object is related to the one or more entities.

In further examples, an entity can include a list of other entities. For example, a developer can define an entity @car as a list of entities (@make, @model), where values @make and @model are set to any of objects with which @make and @model can be associated. For example, entity @car can include compound objects as {make:"Honda"; model:"Accord"}, {make:"Ford"; model:"Fiesta"}, and so forth.

Furthermore, each intent can include a dialog system interaction scheme or rule which are descriptive of a particular relation between a user request and a dialog system response. In other words, an intent can represent a mapping between what a user says and an action to be taken by a software application. In an example, an intent can be determined as a pattern that explicitly includes one or more references for entities. An example pattern can include "what is the weather in @city:city", wherein "@city:city" is a reference for entity @city and parameter city inside the entity @city. In certain additional examples, in order to determine intent, instead of providing patterns containing explicit references for "entities", developers can just provide example requests (phrases) to illustrate intents and entities. In such examples, platform 110 automatically determines, using machine-learning techniques, what "entities" and "intents" are implied in example requests.

Based on example inputs, platform 110 may create corresponding actions. Each action can include a name (entity) and one or more parameters. For example, a request may be entered as follows "Weather forecast for Los Angeles." A machine-learning technique can determine an action with name "weather" and parameter names: city of data type @city.

Thus, developers can use platform interface 112 to generate a plurality of entities and a plurality of intents, both being specific to a particular application or an industry. These pluralities of entities and intents can form dialog system engines 120 and enable dialog system engines 120 to perform certain actions or generate certain outputs in response to a wide range of end user inputs. In certain examples, an intent can include a general structure including: a name of intent (for user reference only), list of patterns and/or example requests, a name of action, parameters associated with the action, and fulfillment associated with the action. The fulfillment may include a text (highlighted text on a screen), or a call to a web service, make a request to a database, and so forth. In some examples, platform 112 can provide an action to developers and allow developers to integrate custom fulfillments associated with the action directly into custom dialog system engine 120. In certain examples, developers may receive the action (name of action and parameters) and integrate the custom fulfilment into client side 140. For example, custom fulfillment may include a request to a website or database to retrieve information (e.g., a forecast, traffic information, and navigation), to perform some operation of a device on which the dialog system interface is running on and the like.

In some examples, dialog system elements may include one or more contexts. The contexts can include one or more parameters containing labels, keys, or clues for intents during a session for a particular end-user. The contexts may include pre-conditions and Boolean expression of the labels. The intent can be triggered based on the input context. For example, intent can be triggered when a certain pre-condition is met or a Boolean expression of pre-conditions is true. Output contexts are set into an end-user session when an intent is executed based on a user's request. In various examples, output contexts can be assigned a certain lifespan within a user session including several user requests. In some examples, the lifespan of an output context can be measured as a number of requests made during the user's session. Within the user session, there is a current context state, which exists prior to execution of an intent in response to the next user request, and a post-execution context state, which is set after the execution of the intent. The post-execution context state can include one or more newly added contexts based on the user request and results of the execution of the intent. Some of the old contexts can be deleted from the post-execution state based on the results of the execution of the intent or due to its expiration.

Contexts can be strings that represent the current context of a user's request. This is helpful for differentiating phrases, which may be vague or have different meanings depending on the user's preferences or geographic location or the topic of conversation. For example, if a user is listening to a music player application and finds a band that catches his interest, he might say something like "I want to hear more of this". A developer can include the name of the band in the context with the request, so that the dialog agent can process it more effectively. In another example, a developer is a manufacturer of smart home devices, and has a mobile application that remotely controls household appliances. A user may say "Turn on the front door light", followed by "Turn it off", and the mobile application will understand that the second phrase is still referring to the light because it is in the same context. Now later, if the user says, "Turn on the coffee machine", and follows this with "Turn it off", it will result in a different action than before, because of the new context. Contexts can be also tied to user sessions (e.g., to a session identifier passed in API calls). If a user expression is matched to an intent, the intent can then set an output context to be shared by this expression in the future.

In further examples, one or more attributes or parameters can be assigned to each context. The attributes can be identified during execution of the intent and used in an actions associated with the intent. The values retrieved from the contexts can form parameters for the action. The attributes can be further put in output contexts set after execution of the intent.

Figure 2:
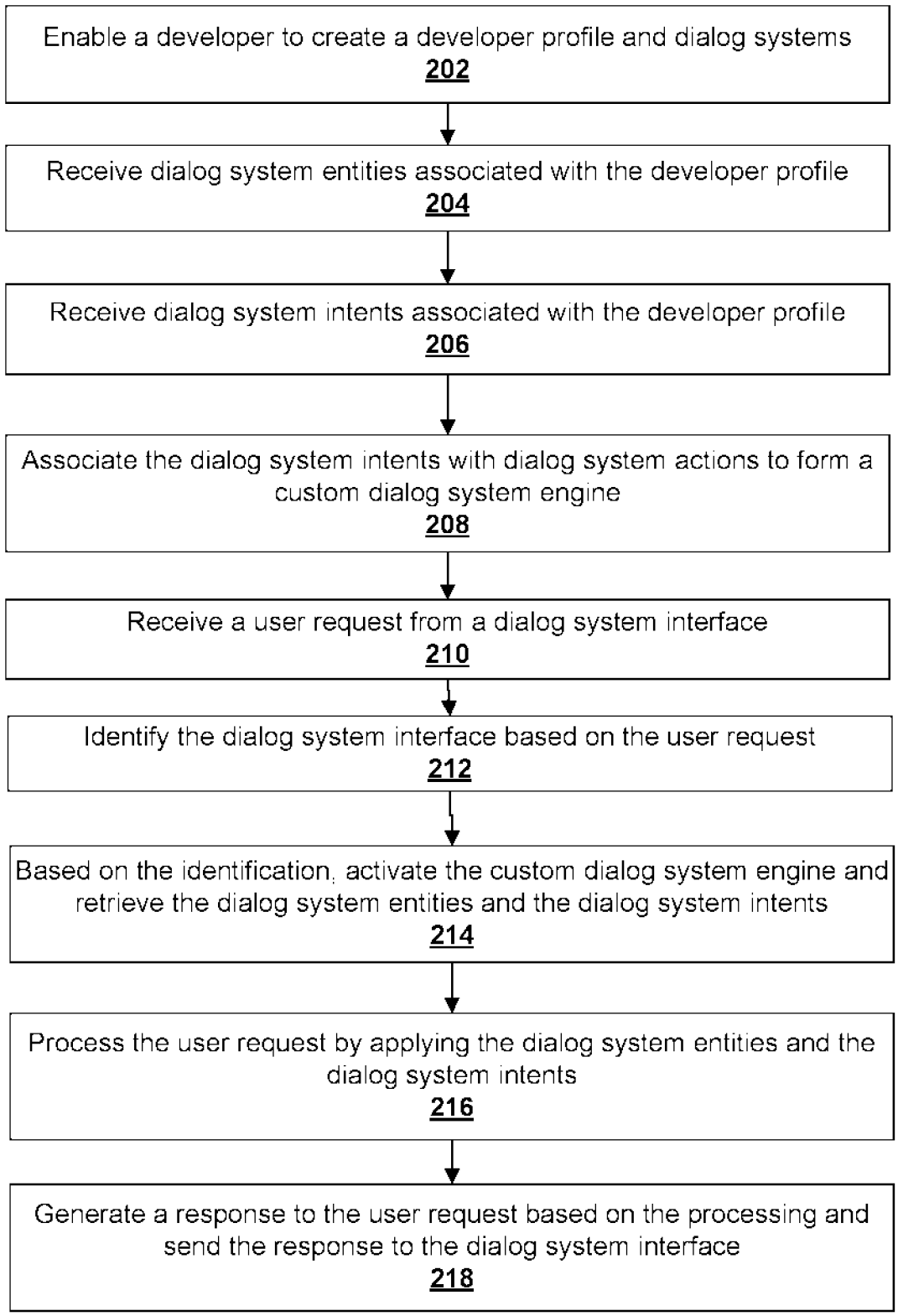
FIG. 2 is a process flow diagram illustrating a method for creating custom dialog system engines using a platform and for operating the platform, according to an example embodiment.

FIG. 2 is a process flow diagram showing a method 200 for creating custom dialog system engines using platform 110 and for operating platform 110 according to one aspect disclosed herein. Method 200 may be performed by processing logic that may comprise hardware (e.g., decision-making logic, dedicated logic, programmable logic, and microcode), software (such as software run on a general-purpose computer system or a dedicated machine), or a combination of both. In one example, the processing logic refers to one or more components of platform 110 or computing device shown in FIG. 10. The steps of method 200 can be implemented in an order different than described and shown in FIG. 2. Moreover, method 200 may have additional steps not shown herein, but which can be evident for those skilled in the art from the present disclosure. Method 200 may also have fewer steps than outlined below and shown in FIG. 2.

Method 200 can commence at operation 202 with enabling a developer to register with platform 110 and create a developer profile by a first server comprising at least one processor and a memory storing processor-executable codes. For these ends, the developer interacts with platform interface 112. The developer profile may virtually link (associate) a custom dialog system engine 120 of the developer and one or more dialog system interfaces 130 deployed on the client sides 140. The linking may include stipulating Application Programming Interface (API) codes, interaction rules, destination addresses, and many more. In certain examples, the developer profile can be accessed by multiple developers. At operation 202, the method may allow the developer to create one or more dialog systems. Each dialog system can be associated with an access identifier (ID). The access ID can be used to access the dialog system from the client side 140 via authentication. In various examples, the access ID may include tokens, digital keys, and so forth.

At operation 204, platform 110 can receive from the developer one or more dialog system entities and stores the same in a memory or database. In some examples, the entities are not received but created by the developer using web tools of platform interface 112. The dialog system entities may include a keyword and at least one synonym to the keyword, a keyword and at least one definition of the keyword, a list of keywords defining objects of one class, and so forth. The dialog system entities can be also associated with or include one or more parameters.

At operation 206, platform 110 receives from the developer one or more dialog system intents and stores the same in the memory or database. In some examples, the dialog system intents are not received, but created by the developer using tools of platform interface 112. As described above, the intents form dialog system elements (custom logic enabling the dialog system engine to generate responses tailored for specific needs). The dialog system intents may include a dialog system interaction scheme, a rule defining a relationship between a user request and a dialog system response, a rule of relationship between a particular action and the one or more dialog system entities, and so forth. In some examples, the developer can explicitly define one or more dialog system entities to be used in one or more dialog system intents. Additionally or alternatively, the developer can provide example request(s) (phrases). Based on the example requests, platform 110 may suggest one or more dialog system entities. To suggest the entities, platform 110 may first search the appropriate entities in the list of entities provided by developer at operation 204. In some examples, the platform 110 may suggest new dialog system entities via a machine-learning technique. The developer can be enabled to approve, modify, or change parameters of the suggested new dialog system entities. The developer can also provide one or more parameters of the intents.

It should be noted that the definition of an entity is not static. During further operations, platform 110 may dynamically redefine the entities defined by the developer. The entities can be redefined (augmented) based on user profile, preferences, user requests, and the like. The redefined entities are used by the platform 110 in further processing.

At operation 208, platform 110 can associate one or more dialog system intents with one or more dialog system actions to create one or more custom dialog system engines 120 or dialog agents. The custom dialog system engine 120 is associated with one or more dialog system interfaces 130 of the developer. Each of the actions is defined by a name and set of aliases associated with the dialog system entities.

Operations 202-208 illustrate a setup process for custom dialog system engines 120 (dialog agents), while operations 210-218 illustrate a process of operating custom dialog system engine 120. In particular, once all dialog system elements of custom dialog system engine 120 are created, they are maintained as a backend service and enable any of the associated dialog system interfaces 130 to provide the full functionality of the dialog system to users according to predetermined settings.

Specifically, at operation 210, platform 110 can receive a user request from an unidentified dialog system interface 130. The user request can be a voice (speech) input or text input. In some examples, dialog system interface 130 can pre-process the user input, for example, by recognizing spoken words and transforming the voice input into text input. In other examples, pre-processing can include audio enhancement, noise cancelation, encryption/decryption, and the like. In other examples, however, no pre-processing is performed by dialog system interface 130.

At operation 212, platform 110 processes the user request and identifies dialog system interface 130. The identification process can be based on retrieving an identifier of dialog system interface 130 from the user request. For example, the user request can be accompanied by an identifier at the time the user request is sent from dialog system interface 130 to platform 110.

At operation 214, based on the result of identification at operation 212, platform 110 activates custom dialog system engine 120 associated with the identified dialog system interface 130. At the same operation 214, platform 110 may also retrieve or identify one or more dialog system elements (i.e., one or more entities and one or more intents) based on the result of identification at operation 212. At operation 214, platform 110 may identify contexts (one or more labels, keys, clues, and logical expressions of thereof) associated with the user request and a particular request session.

At operation 216, custom dialog system engine 120 processes the user request using the dialog system elements (i.e., one or more entities and one or more intents) as retrieved at operation 214. The intents can be triggered based on contexts. The contexts can be pre-defined, determined based on the user requests, and further changed after one or more intents are triggered. The contexts can be specific for a particular user and particular session of the user. Some examples of dialog system processing are further described with reference to FIG. 3.

At operation 218, custom dialog system engine 120 can generate a response and send it to the dialog system interface 130 associated with the custom dialog system engine 120. The response may include particular data, for example a text message, and/or and one or more actions. Each action can include a name of the action and a set of parameters identified with the use of one or more intents and the one or more entities. Dialog system interface 130 may then display or playback the text message to the end user depending on predetermined settings. Dialog system interface 130 can also perform one or more operations based on the one or more actions using action name and set of parameters and according to a custom fulfillment associated with action. In some examples, custom dialog system engine 120 can process the custom fulfillment and send the results to the dialog system interface 130. The response of custom dialog system engine 120 can also refer to an action instruction that can be executed by a client device, web resource/service 160, platform 110, or a remote server.

Figure 3:
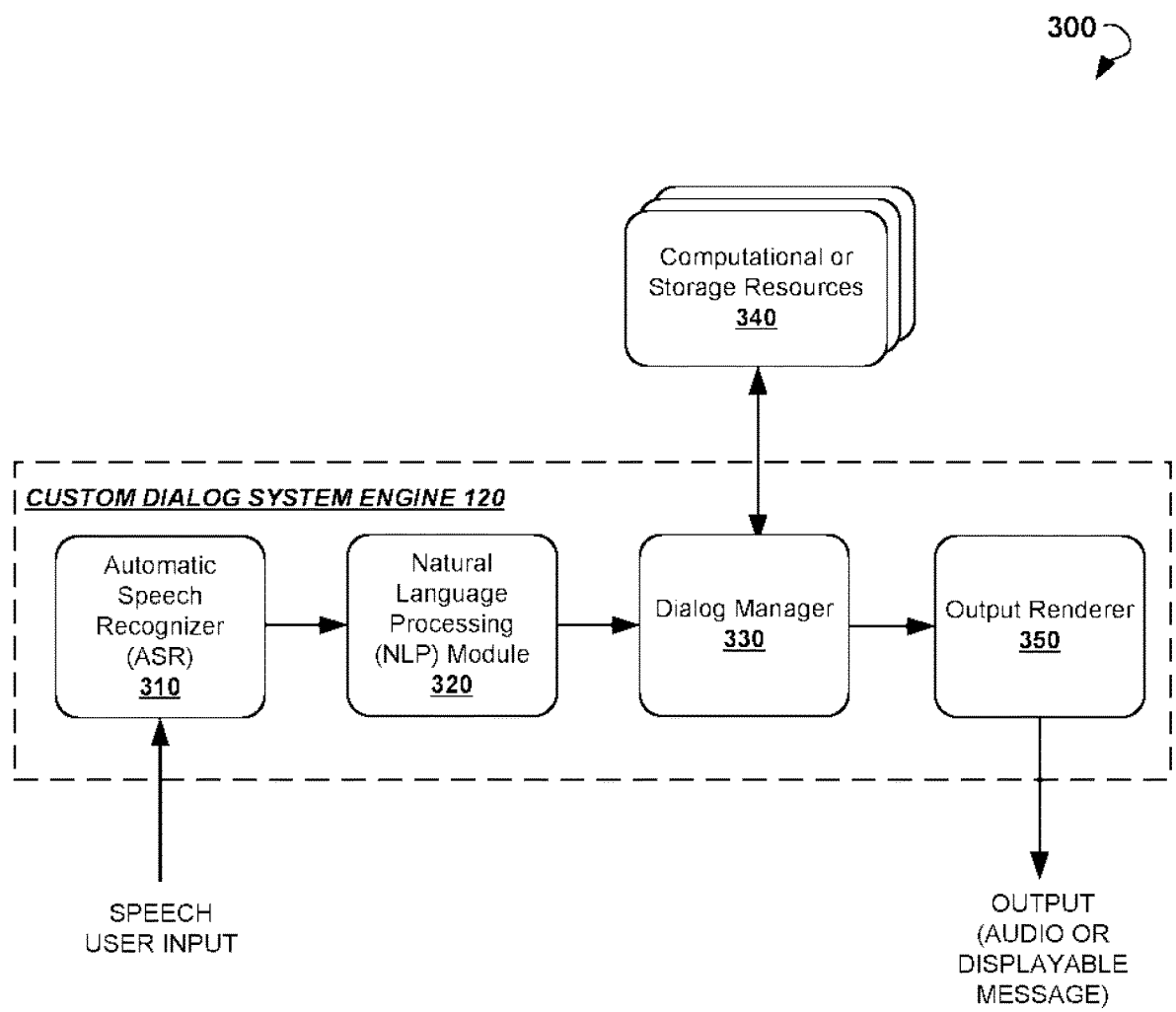
FIG. 3 shows a high-level architecture of a dialog system engine, according to an example embodiment of the disclosure.

FIG. 3 shows a high-level architecture 300 of dialog system engine 120, according to an example. It should be noted that every module of dialog system engine 120 or associated architecture includes hardware components, software components, or a combination thereof. Dialog system engine 120 may be embedded or installed in a user device or server, or may be presented as a cloud computing module and/or a distributed computing module.

In the example illustrated in FIG. 3, dialog system engine 120 includes an Automatic Speech Recognizer (ASR) 310 configured to receive and process speech-based user inputs into a sequence of parameter vectors. ASR 310 further converts the sequence of parameter vectors into a recognized input (i.e., a textual input having one or more words, phrases, or sentences). ASR 310 includes one or more speech recognizers such as a pattern-based speech recognizer, free-dictation recognizer, address book based recognizer, dynamically created recognizer, and so forth.

Furthermore, dialog system engine 120 includes a Natural Language Processing (NLP) module 320 for understanding spoken language input. Specifically, NLP module 320 may disassemble and parse the recognized input to produce utterances, which are then analyzed utilizing, for example, morphological analysis, part-of-speech tagging, shallow parsing, neural networks, machine learning classifier, pattern-mined classifier, and the like. NLP module 320 may then map recognized input or its parts to meaning representations.

Dialog system engine 120 further includes a dialog manager 330, which coordinates the activity of all components, controls dialog flows, and communicates with external applications, devices, services, or resources. Dialog manager 330 may play many roles, which include discourse analysis, knowledge database query, and system action prediction based on the discourse context. In some examples, dialog manager 330 may contact one or more task managers (not shown) that may have knowledge concerning specific task domains. In some examples, dialog manager 330 may communicate with various computing, logic, or storage resources 340, which may include, for example, a content storage, rules database, recommendation database, push notification database, electronic address book, email or text agents, dialog history database, disparate knowledge databases, map database, points of interest database, geographical location determiner, clock, wireless network detector, search engines, social networking websites, blogging websites, news feeds services, and many more. In some examples, computational or storage resources 340 include one or more web resources/services 160 discussed above.

During operation (e.g., within a dialog session), dialog manager 330 may control dialog flows according to input and output contexts. The input contexts represent some of the pre-conditions for intent execution. A particular intent will trigger only if a certain input context(s) is present in a user request or as result of execution of previous intents. If several intents can be triggered based on the same context, then a decision about which intent is to be executed can be based on a weight of the intent related to the context, age of context, and other parameters as specified in the preferences.

Newer context can have a higher priority. Output contexts can be set upon a match and execution of the intent.

In various examples, dialog manager 330 can pass the user request to dialog systems. The dialog systems can include custom dialog systems designed by a developer as described in FIG. 1 and FIG. 2. At the same time, in some examples, the user requests can be sent in parallel to task domains. The task domains are pre-built dialog systems that may process the request and provide an answer. In some examples, if the custom dialog systems fail to provide an answer to the user request, then dialog manager 330 proceeds with an answer received from the task domains.

Dialog manager 330 may employ multiple disparate approaches to generate outputs in response to recognized inputs. Some approaches include the use of statistical analysis, machine-learning algorithms (e.g., neural networks), heuristic analysis, and so forth. Dialog manager 330 is one of the central components of dialog system engine 120. The major role of the dialog manager 330 is to select the correct system actions based on observed evidences and inferred dialog states from the results of NLP (e.g., dialog act, user goal, and discourse history). In addition, dialog manager 330 can handle errors when the user input has ASR and NLP errors caused by noises or unexpected inputs.

Dialog system engine 120 may further include an output renderer 350 for transforming the action selected by dialog manager 330 into output in a form suitable for providing to the user or in a form of computer-implementable or processor-implementable instruction (e.g., API code). For example, the output renderer 350 may employ a text-to-speech engine or may contact a pre-recorded audio database to generate an audio message corresponding to the output of dialog manager 330. In certain examples, output renderer 350 may present or cause to present the output of dialog manager 330 as a text message, an image, or a video message for further displaying on a display screen of the user device.

In other examples, output render 350 provides a selected action (a name of an action and set of parameters) to dialog system interface 130 on client side 140. Developers may configure dialog system interface 130 to process the selected action and perform one or more required operations like sending a request to a web service, database operations, display a text message, play an audio or video on the user device, generate a text, process it through a text-to-speech system, and so forth. In some examples, developers may configure custom dialog system engine 120 to process the action according to fulfillment associated with the action and provide the result to dialog system interface 130.

Figure 4:
FIG. 4 shows a Graphical User Interface (GUI) of a platform interface for creating a new dialog system entity, according to an example embodiment of the disclosure.

FIG. 4 shows an example GUI 400 of platform interface 112 for creating a new dialog system entity as discussed above. When the developer desires to create custom dialog system engine 120, he may define dialog system entities and intents using web tools of platform interface 112, such as GUI 400. Using the GUI 400, the developer can enter reference value 402 for a keyword and enter synonym 404 for the provided reference value in the corresponding fields provided by GUI 400. The dialog system entities may include a keyword (or reference value) and synonyms to the keyword, a keyword and definitions of the keyword, a list of keywords defining objects of one class, and so forth. Keywords or reference values with their synonyms and/or definitions compose a dialog system entity.

In some examples, each entity can have a title. For example, one entity can be titled as "city" and contain a list of cities such as Arlington, Boston, Chicago, and so forth. In other examples, an entity can be titled as a keyword and it can contain synonyms or definitions of this keyword. In one example, the entity called "music" may include the terms of song, singer, singing, musician, and so forth. In another example, the entity called "artist" may include a list of music bands, music ensembles, or music artists. In another example, the entity called "Beatles" may include a list of possible synonyms, such as "The Beatles," "Beatles," "Fab Four," "Liverpool Legends," "John Lennon," and so forth. In yet another example, there can be an entity called "Artist," which may include various artist names, artist name synonyms, music band names, and so forth.

Figure 5:
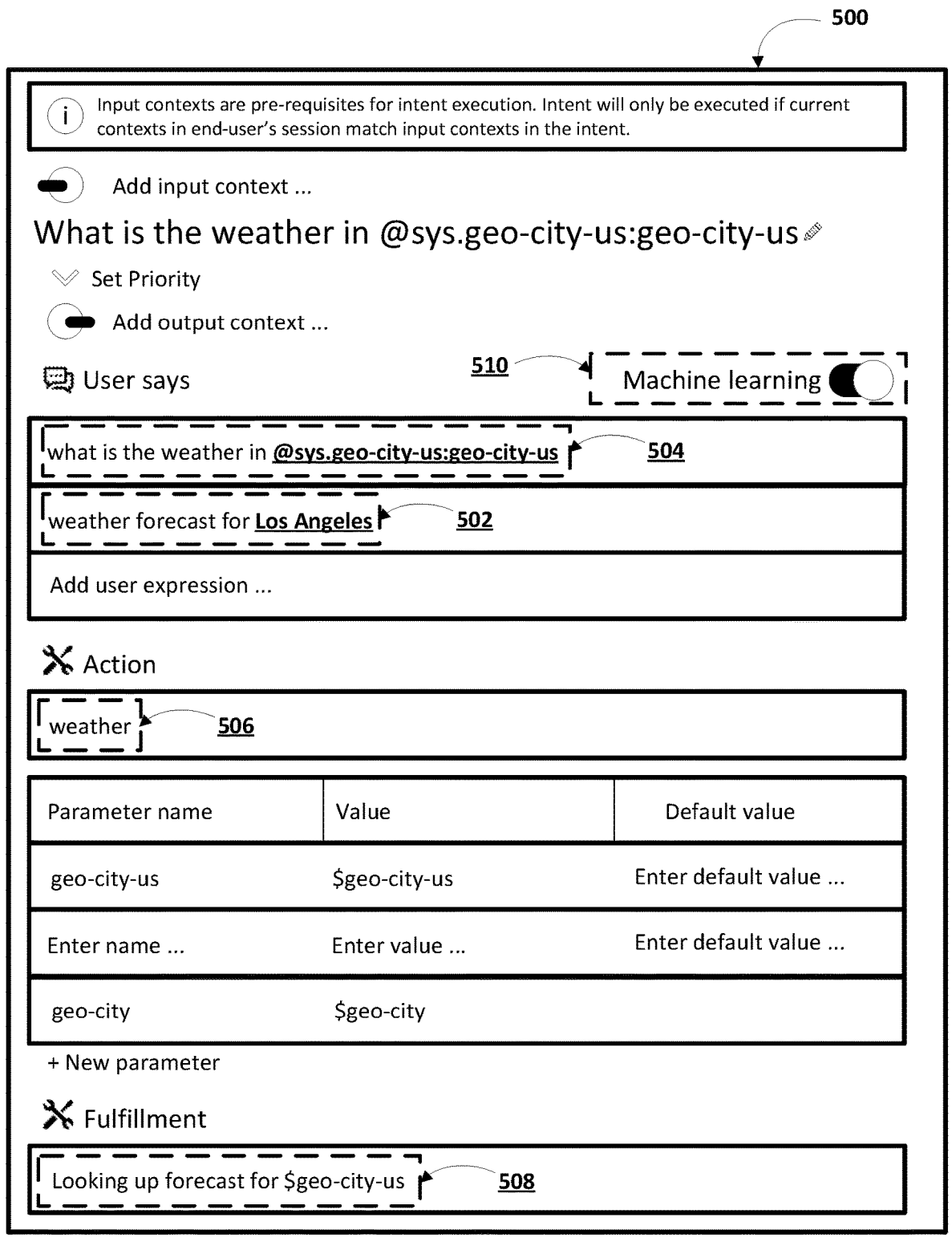
FIG. 5 shows a GUI of a platform interface for creating a new dialog system intent, according to an example embodiment of the disclosure.

FIG. 5 shows an example GUI 500 of platform interface 112 for creating a new dialog system intent as discussed above. The dialog system intent may define a relation between a user request and a dialog system response and may be associated with a rule based on a relationship between a particular action and an entity. In general, each intent can be represented as the following computer-readable procedure "[Action] @[Entity]" or "[Action] @[Entities]." Using GUI 500, a developer may add user expression 502 (e.g. "Weather @city") to illustrate intents and entities. Based on user expression 502, platform 110 automatically determines, using machine-learning techniques, what entities and intents are implied in example requests and creates a corresponding rule. For example, the developer may simply provide example requests, such as "Weather forecast for Los Angeles". Platform 110 may match "Los Angeles" to existing entities (system or user defined) and generate corresponding "[Action] @[Entity]" rules automatically. Additionally or alternatively, the developer may provide an example request where one or more entities are presented explicitly, such as "What is the weather in @say.geo-city:geo-city-us". In example of FIG. 5, "weather" and parameters associated with action 506 are "geo-city-us" and "geo-city". The developer can further modify action 506 and provide a fulfillment 508 for action 506.

The created rule means that a particular action shall be performed by client side 140 (or server, web service, etc.) with respect to the entity or several entities. For example, one intent may be represented as "looking up forecast for $geo-city-us." In this example, the intent orders dialog system engine 120 to look for forecast in Los Angeles.

In some examples, GUI 500 provides control 510 for machine learning. Toggling a machine-learning algorithm can allow handling fuzziness of the match ranging from hard/rigid matches to broad fuzzy or machine learned matches.

Figure 6:
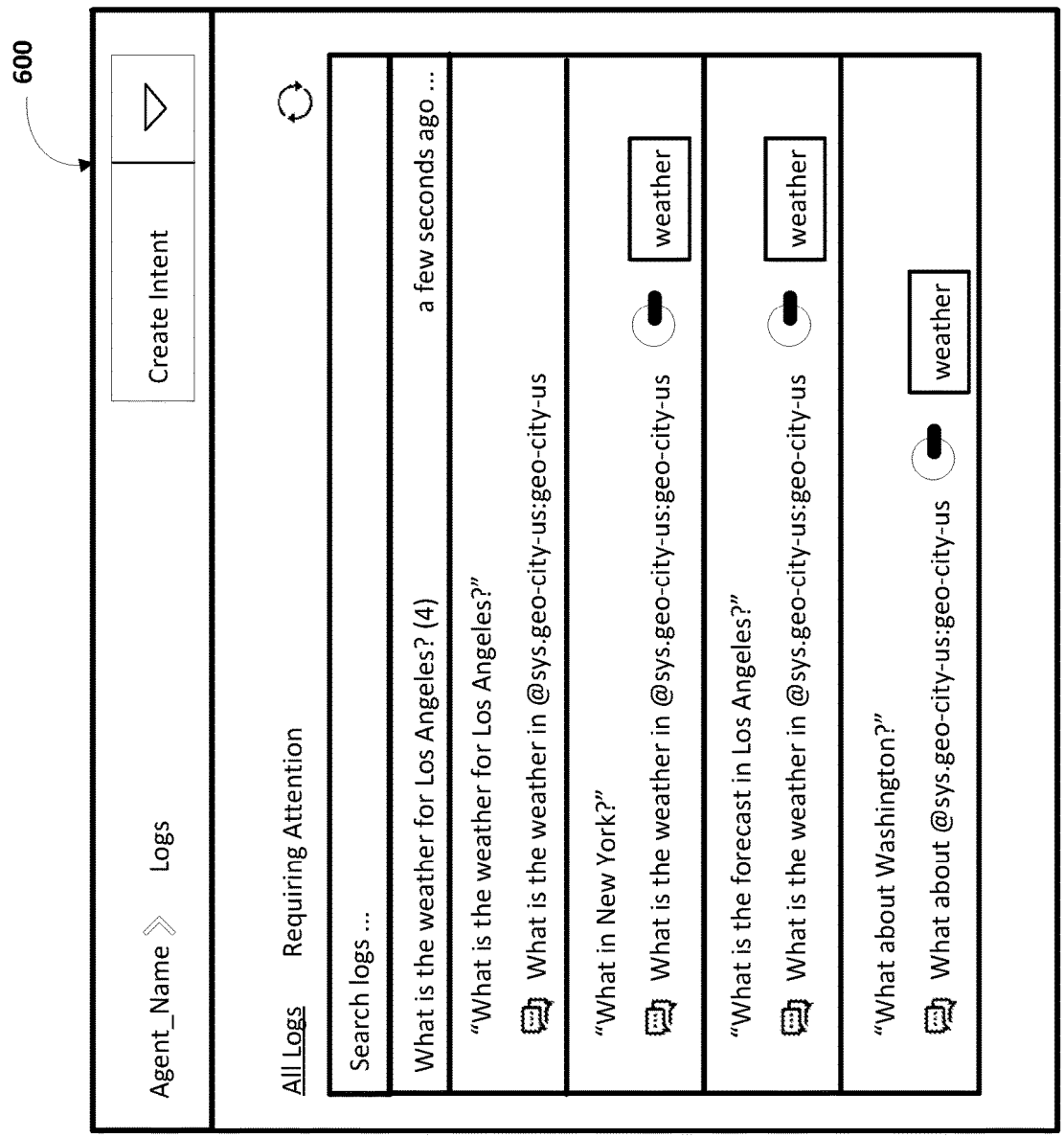
FIG. 6 shows a GUI of a platform interface for providing logs for processing requests by a dialog system, according to an example embodiment of the disclosure.

In some examples, platform interface 112 may provide GUI for providing logs of requests and processing intents associated with a particular dialog system end user or group of end users. FIG. 6 shows an example GUI 600 for providing a log of requests of a particular user.

In various examples, platform interface 112 may provide developers with tools for statistical analysis of performance of a custom dialog system. The resulting statistics may include a number of sessions, number of requests, number of classified requests (for which at least one intent is triggered), number of unclassified requests (for which no intent is triggered), precision, recall, F-scores for requests, and the like. In some examples, unclassified requests are divided in groups based on a machine learning clustering.

In further examples, platform interface 112 may provide tools for marking up entities in unclassified requests by a developer or a machine learning technique to modify or generate new entities, intents, actions and fulfillment for the request. Platform interface 112 may include tools for re-classifying the request by one or more custom dialog systems.

Figure 7:
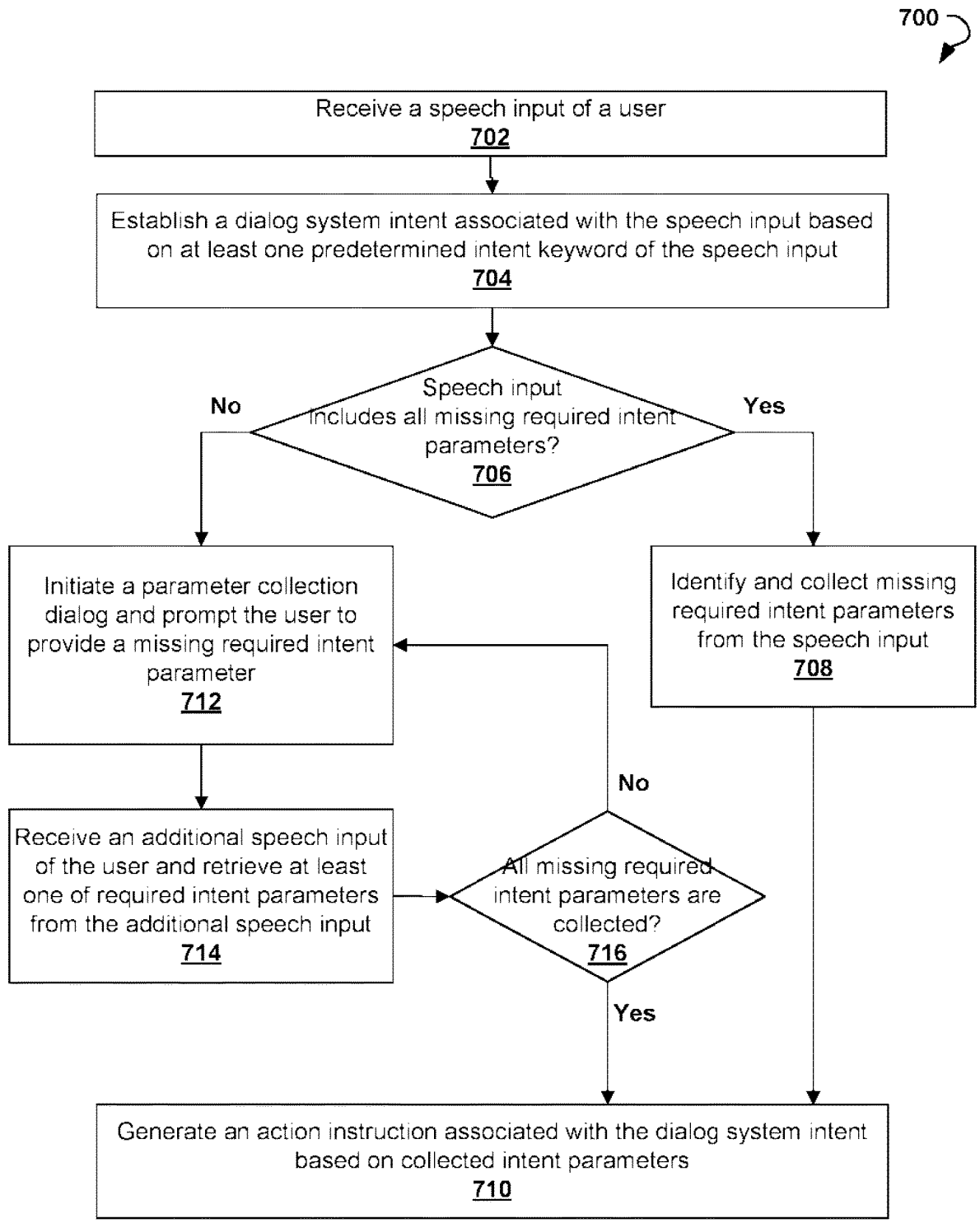
FIG. 7 is a process flow diagram showing a method for collecting intent parameters, according to an example embodiment of the disclosure.

FIG. 7 is a process flow diagram showing a method 700 for collecting intent parameters and operating a dialog system according to an example. Method 700 can be performed by processing logic that may comprise hardware (e.g., decision-making logic, dedicated logic, programmable logic, application-specific integrated circuit (ASIC), and microcode), software (such as software run on a general-purpose computer system or a dedicated machine), or a combination of both. In one example, the processing logic refers to platform 110, backend service 114, custom dialog system engine 120, computing device 1000, or any combination thereof. The below recited steps of method 700 may be implemented in an order different than described and shown in the figure. Moreover, method 700 may have additional steps not shown herein, but which can be evident for those skilled in the art from the present disclosure. Method 700 may also have fewer steps than outlined below and shown in FIG. 7.

The method 700 can commence at operation 702 with a dialog system (e.g., custom dialog system engine 120) receiving a speech input of a user. The speech input can be provided to client side 140 through dialog system interface 130. The speech input can be processed at client side 140 or by the dialog system. For example, the speech input can be recognized and transformed into a computer-readable text input.

At operation 704, the dialog system (e.g., custom dialog system engine 120) can identify or determine a dialog system intent associated with the speech input based on at least one predetermined intent keyword of the speech input. In other words, the dialog system can process the speech input to determine if one or more intent keywords refer to one of the predetermined intents. For example, the speech input "Please order a pizza for me" includes intent keywords "order" and "pizza" which can cause triggering or detecting a predetermined "Order Pizza" intent (that can be previously created by developers via platform 110). The dialog system intent can be indicative of an entry point into a parameter collection dialog for collecting intent parameters. In the given example, intent parameters can include a pizza size, type of crust, selection of toppings, sauce, delivery address, delivery time, vendor, and the like. Accordingly, the intent parameters can be associated with a parameter name and its value. The parameter value can include a numerical value, a word, a phrase, a sound, or an image. In some implementations, some or all of the intent parameters can be selected from a list of predetermined values (e.g., one intent parameter can be selected from a list of predetermined city names).

At operation 706, the dialog system can determine whether the speech input already includes all of the missing required intent parameters. If it is determined that all of the missing required intent parameters are present in the speech input given at operation 702, the method can proceed to operation 708. At operation 708, the dialog system can identify and collect the missing required intent parameters from the speech input. The collected required intent parameters can be temporarily stored in a cache or memory.

At operation 710, once all of the required missing intent parameters are collected, the dialog system generates an action instruction associated with the dialog system based on the intent and intent parameters. The action instruction can be configured to cause the dialog system, server, user device, or dialog system interface to implement a predetermined action based on the action instruction and one or more intent parameters. In the above-given example, the action instruction can refer to an electronic purchase order that can be sent to a predetermined web service 160 for ordering a pizza based on the intent parameters collected earlier. Accordingly, in some examples, the action instruction can include an API specific response (or API code) configured to cause an API service. For example, the API code of the action instruction can be in a JavaScript Object Notation (JSON) format.

In some examples, at operation 710, prior to the generation of the action instruction, the dialog system can generate a response message and present it to the user. The response message can repeat one or more of the collected intent parameters and ask the user to confirm whether the intent parameters are correct. For example, the dialog system can generate a text or audio message to be delivered via dialog system interface 130 such as, "You want to order a large margherita pizza to be delivered to your home in an hour. Is that correct?" If the user responds affirmatively, the dialog system can proceed with rendering the action instruction as described above. Otherwise, the dialog system can provide one or more prompts to ask the user to clarify his request.

If at operation 706, it is determined that the initial speech input (acquired at operation 702) does not include all of the missing required intent parameters, the method can proceeds to operation 712 as shown in FIG. 7. At operation 712, the dialog system can initiate a predetermined parameter collection dialog associated with the intent identified at operation 704. The predetermined parameter collection dialog can include a number of prompt messages that can be asked by the dialog system to obtain missing required intent parameters and, in some examples, optional intent parameters. Thus, at operation 712, the dialog system and provide one or more prompts to the user to prompt the user to input one or more missing intent parameters. For example, at operation 712, the dialog system can ask the user "What pizza size would you like—large, medium or small?" or "Tell me what toppings you would like to have?"

At operation 714, the dialog system can receive one or more additional speech inputs from the user that include answers to the prompts given at the previous operation. The dialog system can retrieve the required intent parameters from the additional speech inputs or from other sources. At operation 716, the dialog system can determine if all required intent parameters are available. If it is determined that all of the required intent parameters are available, the method can proceed to operation 710. Otherwise, if it is determined that not all of the required intent parameters are available, the method can proceed back to operation 712 as shown in FIG. 7. The operations 712, 714, and 716 can be repeated until all of the missing required intent parameters are collected.

Figure 8:
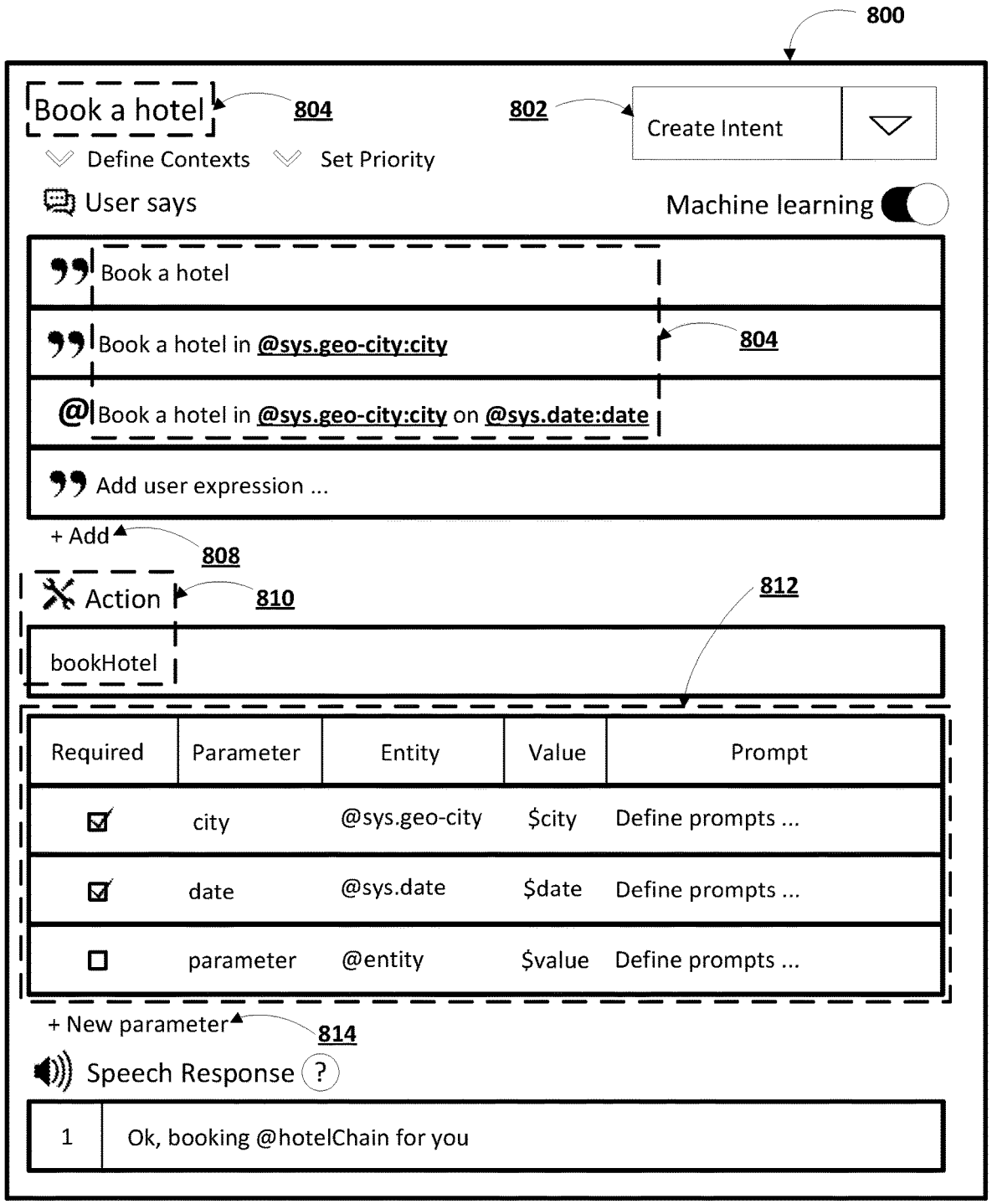
FIG. 8 shows an example GUI of a platform interface for creating a dialog agent for collecting intent parameters by a parameter collection dialog, according to an example embodiment of the disclosure.

As discussed above, platform 110 can enable developers to create or modify dialog agents of natural speech dialog system to automate collection of the all required intent parameters. Each developer can have a developer profile with platform 110 storing all of the developer's custom dialog system engines and dialog agents. FIG. 8 shows an example GUI 800 of platform interface 112 for creating a dialog agent for collecting intent parameters in a parameter collection dialog according to an example.

As shown in FIG. 8, GUI 800 includes an actionable button 802 that can cause creating a dialog system intent. For example, a developer can create an intent to electronically book hotels and create a parameter collection dialog for this intent to collect all of the intent parameters required to properly book a hotel reservation. First, the developer can name the newly created intent such as "book a hotel" intent as shown by widget 804 in FIG. 8. Further, the developer can provide via the interface of GUI 800 one or more example phrases or keywords that can trigger activation of this intent. For these ends, the developer can provide example phrases or keywords through widget 806. Some example phrases or keywords for "book a hotel" intent include "book a hotel", "book a hotel in @sys.geo-city:city" or "book a hotel in @sys.geo-city:city on @sys.date:date." Here, @sys.geo-city:city and @sys.date:date refer to entities "city" and "date," respectively. In other words, in some examples, example phrases or keywords to trigger intents can be associated with one or more entities. By clicking on button 808, the developer can add additional example phrases or keywords associated with this intent.

Furthermore, the developer can select one of the predetermined actions or create a new action to be performed when the intent is executed by the dialog system. Here, a widget 810 shows that the developer selected one of the predetermined or created a new action "bookhotel" that can be customized through another GUI of platform interface 112. Further, the developer can provide one or more intent parameters that shall be collected in the parameter collection dialog when it is activated in the course of dialog with a user. The intent parameters can include "city," "date," and so forth. As shown in FIG. 8, the intent parameters are provided, identified or modified via GUI widget 812. By clicking on button 814, the developer can add a new intent parameter to the list. Each of the intent parameters can have a number of characteristics. For example, the developer can designate if an intent parameter is required (mandatory) or optional. Further, the developer can provide or modify a parameter name, a parameter data type, and a parameter value, and provide one or more prompt messages. The dialog system can ask the prompt messages of each of the intent parameters during the parameter collection dialog to acquire all missing intent parameter values (e.g., as described above with reference to operations 712 and 714 of method 700).

FIG. 9 shows an example GUI of platform interface 112 for defining prompts of a dialog agent, according to an example. As shown in the figure, each of the intent parameters can be associated with the parameter name (e.g., city), parameter data type (e.g., @sys.geo-city), parameter value (e.g., $city), and one or more prompt messages 902. Here, the parameter data type and parameter value can refer to a dialog system entity. Moreover, prompt messages 902 can refer to "Where are you going?" and "What is the destination?" The developer can provide as many prompts as he wants. The order of selecting and delivering the prompts to the user can be arbitrary or predetermined by the developer.

As already discussed above, some parameters can be mandatory (required) to be asked to the user and to collect their respective values from the user, while some other parameters can be optional. For example, the "city" parameter can be mandatory, but the name of hotel chain can be optional.

Figure 10:
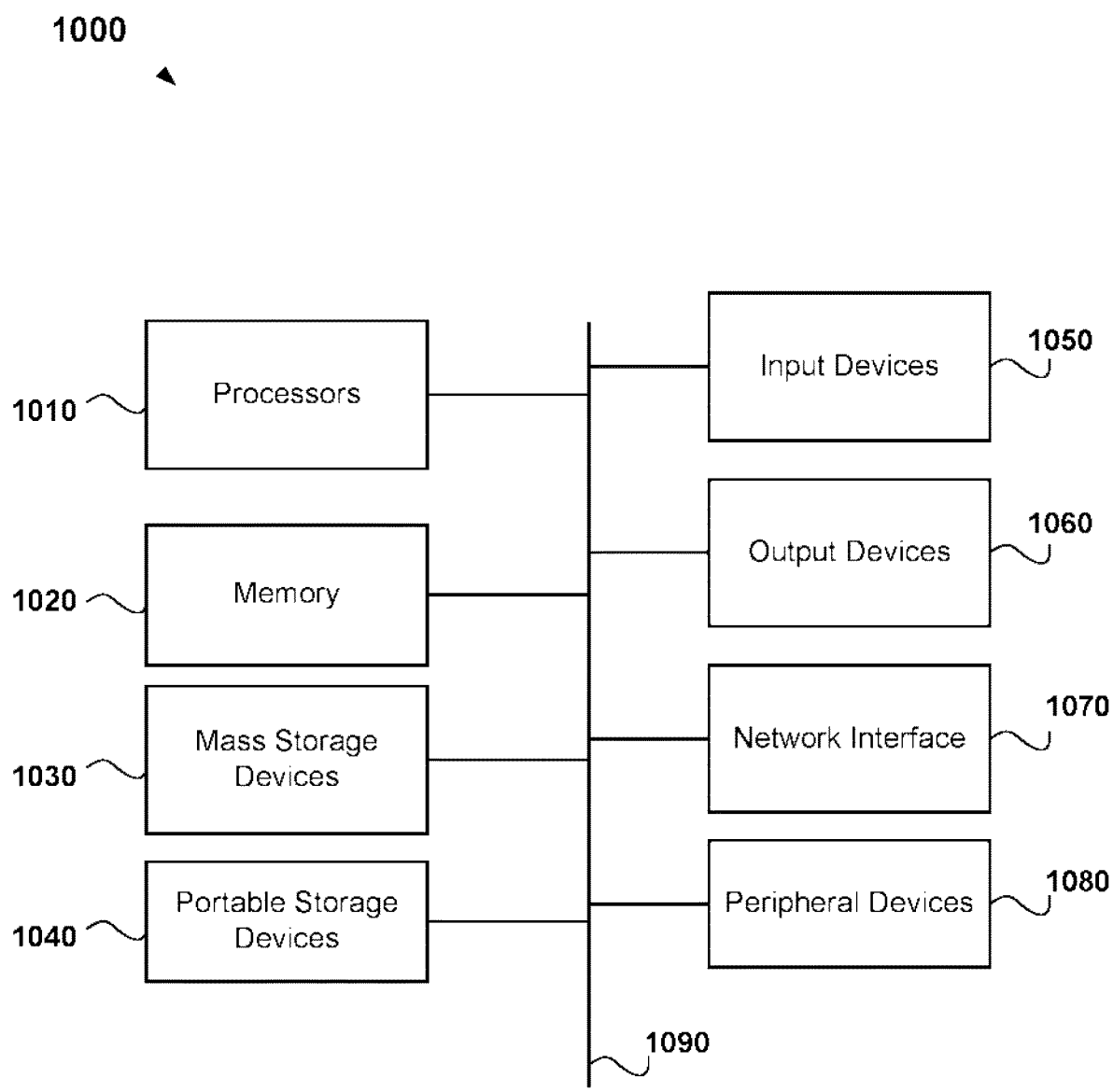
FIG. 10 is a high-level block diagram illustrating an example computing device suitable for implementing methods described herein.

FIG. 10 is a high-level block diagram illustrating a computing device 1000 suitable for implementing the methods described herein. In particular, computing device 1000 may be used for creating and modifying dialog systems by developers and for executing dialog systems. Computing device 1000 may include, be, or be an integral part of one or more of a variety of types of devices, such as a general-purpose computer, desktop computer, laptop computer, tablet computer, server, netbook, mobile phone, smartphone, infotainment system, smart television device, among others.

In some examples, computing device 1000 can be regarded as an instance of client device, server, platform 110, or dialog system.

As shown in FIG. 10, computing device 1000 includes one or more processors 1010, memory 1020, one or more mass storage devices 1030, one or more input devices 1050, one or more output devices 1060, network interface 1070, one or more optional peripheral devices 1080, and a communication bas 1090 for operatively interconnecting the above-listed elements. Processors 1010 can be configured to implement functionality and/or process instructions for execution within computing device 1000. For example, processors 1010 may process instructions stored in memory 1020 and/or instructions stored on storage devices 1030. Such instructions may include components of an operating system or software applications.

Memory 1020, according to one example, is configured to store information within computing device 1000 during operation. Memory 1020, in some examples, may refer to a non-transitory computer-readable storage medium or a computer-readable storage device. In some examples, memory 1020 is a temporary memory, meaning that a primary purpose of memory 1020 may not be long-term storage. Memory 1020 may also refer to a volatile memory, meaning that memory 1020 does not maintain stored contents when memory 1020 is not receiving power. Examples of volatile memories include random access memories (RAM), dynamic random access memories (DRAM), static random access memories (SRAM), and other forms of volatile memories known in the art. In some examples, memory 1020 is used to store program instructions for execution by processors 1010. Memory 1020, in one example, is used by software applications. Generally, software applications refer to software applications suitable for implementing at least some operations of the methods for collecting intent parameters and operating a dialog system as described herein.

Mass storage devices 1030 can also include one or more transitory or non-transitory computer-readable storage media and/or computer-readable storage devices. In some examples, mass storage devices 1030 may be configured to store greater amounts of information than memory 1020. Mass storage devices 1030 may be also configured for long-term storage of information. In some examples, mass storage devices 1030 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 10, computing device 1000 may also include one or more input devices 1050. Input devices 1050 may be configured to receive input from a user through tactile, audio, video, or biometric channels. Examples of input devices 1050 may include a keyboard, keypad, mouse, trackball, touchscreen, touchpad, microphone, video camera, image sensor, fingerprint sensor, or any other device capable of detecting an input from a user or other source, and relaying the input to computing device 1000 or components thereof. Output devices 1060 may be configured to provide output to a user through visual or auditory channels. Output devices 1060 may include a video graphics adapter card, a display, such as a liquid crystal display (LCD) monitor, a light emitting diode (LED) monitor, or an organic LED monitor, a sound card, a speaker, a lighting device, a projector, or any other device capable of generating output that may be intelligible to a user. Output devices 1060 may also include a touchscreen, presence-sensitive display, or other input/output capable displays known in the art.

Computing device 1000 can also include network interface 1070. Network interface 1070 can be utilized to communicate with external devices via one or more networks such as one or more wired, wireless, or optical networks including, for example, the Internet, intranet, local area network, wide area network, cellular phone networks (e.g., Global System for Mobile communications network, Long-Term Evolution communications network, packet switching communications network, circuit switching communications network), Bluetooth radio, and an IEEE 802.11-based radio frequency network, among others. Network interface 1070 may be a network interface card, such as an Ethernet card, an optical transceiver, a radio frequency transceiver, or any other type of device that can send and receive information.

An operating system of computing device 1000 may control one or more functionalities of computing device 1000 or components thereof. For example, the operating system may interact with the software applications and may facilitate one or more interactions between the software applications and processors 1010, memory 1020, storage devices 1030, input devices 1050, output devices 1060, and network interface 1070. The operating system may interact with or be otherwise coupled to software applications or components thereof. In some examples, software applications may be included in the operating system.

Thus, methods and systems for collecting intent parameters in dialog systems have been described. Although certain aspects have been described with reference to specific examples, it will be evident that various modifications and changes can be made to these examples without departing from the broader spirit and scope of the present application. Accordingly, the specification and drawings are to be regarded in an illustrative rather than a restrictive sense.

The foregoing detailed description includes references to the accompanying drawings, which form a part of the detailed description. Approaches described in this section are not prior art to the claims and are not admitted to be prior art by inclusion in this section. The drawings show illustrations in accordance with examples disclosed herein. These examples, which are also referred to herein as "examples," are described in enough detail to enable those skilled in the art to practice the present subject matter. The examples can be combined, other examples can be utilized, or structural, logical and operational changes can be made without departing from the scope of what is claimed. The following detailed description is, therefore, not to be taken in a limiting sense, and the scope is defined by the appended claims and their equivalents.

The examples provided above are referenced in the accompanying drawings by various blocks, components, circuits, steps, operations, processes, algorithms, etc., collectively referred to as "elements." These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise a random-access memory, a read-only memory, an electrically erasable programmable random-access memory (EEPROM), compact disk random-access memory, or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

The terms "natural language dialog system" and "dialog system" can be used interchangeably and shall be construed to mean a computer-implemented system for providing human-machine dialog interaction using text, speech, graphics, haptics, gestures, computer-generated actions, and other modes of communication on both the input and output channel, where responses to user input are generated by one or more dialog system agents or dialog system engines, and where the system provides an interface for receiving, processing, managing, and delivering information. The terms "chat information system," "spoken dialog system," "conversational agent," "chatter robot," "chatterbot," "chatbot," "chat agent," "digital personal assistant," "automated online assistant," and the like are within the scope of the term "dialog system."

The terms "client device" and "user device" shall be construed to mean any electronic or computing device on client side 140 with input and output capabilities, such as a mobile device, cellular phone, mobile phone, user equipment, user terminal, smart phone, tablet computer, laptop computer, desktop computer, server, personal digital assistant, music player, multimedia player, portable computing device, navigation system, vehicle computer, infotainment system, gaming device, game console, entertainment system, television device, network device, modem, router, and so forth.

The term "user" shall mean a user of "client device" and "user device." The term "developer" shall be construed to mean a software developer, engineer or owner of dialog system engines (agents) that can be created and maintained via platform 110.

The term "dialog system agent" and "dialog system engine" can be used interchangeably and can be construed to mean a computer-implementable interface for processing user inputs based on one or more predetermined rules or criteria such as dialog system elements, including dialog system intents and dialog system entities.

Technical effects disclosed herein can provide improvements for natural language dialog systems in processing user requests and collecting a plurality of parameters (or parameter values) associated with a user request to produce a computer-implemented action based on the plurality of parameters.

Further technical effects disclosed herein can provide improvements in the hardware performance by reducing calls to memory looking for attributes, thus reducing latency and improving battery life, reducing steps, interfaces, and calls to memory needed to set up voice actions and so forth.

In situations in which systems or methods discussed herein collect personal information about a user, or may make use of personal information, the user may be provided with an opportunity to control the collection of and/or use of such personal information, limiting some or all collection of such data. For example, when use of context for identification of parameters is available, a user may be provided with the ability to limit the collection of some or all context data. In addition, certain data may be treated in one or more ways before it is stored or used, so that personally identifiable information is removed or obscured. For example, a user's identity may be treated so that no personally identifiable information can be determined for the user, or a user's geographic location may be generalized so that a particular location of the user cannot be determined. Thus, the user may be provided control over how information is collected about the user and used by the systems and methods disclosed herein.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method implemented by one or more processors, the method comprising:
   receiving, via a platform interface, a plurality of instances of user interface input from a developer creating a dialog agent for a dialog system;
   determining, based on the instances of user interface input:
      at least one intent keyword that is a trigger for a dialog system intent of the dialog agent;
      one or more system parameters, for the dialog system intent, that are each defined based on a corresponding system entity indicated by a corresponding one of the instances of user interface input, wherein the corresponding system entities are predefined for the dialog system;
      one or more developer parameters, for the dialog system intent, that are each defined based on a corresponding developer entity, wherein the corresponding developer entities are each created by the developer through providing, via one or more corresponding ones of the instances of user interface input, one or more corresponding reference terms and one or more corresponding synonyms;
      for each of the developer parameters and the system parameters, whether it is a mandatory parameter for the dialog system intent or an optional parameter for the dialog system intent;
      for each of the mandatory parameters, a corresponding prompt message; and
      an action to be performed when the dialog system intent is triggered and values for at least the mandatory parameters are resolved, wherein the action is performed based on the resolved values;
   associating the at least one intent keyword with triggering of the dialog system intent of the dialog agent, associating the dialog system intent with the action, and associating the developer parameters and the system parameters with the dialog system intent, and with an indication of whether they are mandatory or optional parameters;
   subsequent to the associating:
      receiving a speech input provided via a dialog system interface of a client device, the dialog system interface being associated with the dialog system;
      processing the speech input, using an automatic speech recognizer, to generate a recognized input;
      determining that the recognized input includes the at least one intent keyword that is the trigger for the dialog system intent of the dialog agent;
      responsive to determining that the recognized input includes the at least one intent keyword that is the trigger for the dialog system intent of the dialog agent:
         determining whether values for all of the mandatory parameters for the dialog system intent are all resolvable based on the recognized input, and without initiating a parameter collection dialog;
         when it is determined that the values for all of the mandatory parameters are resolvable without initiating the parameter collection dialog:
            initiating performance of the action based on the values for all the mandatory parameters, without initiating the parameter collection dialog;
         when it is determined that values for all of the mandatory parameters are not resolvable without initiating the parameter collection dialog:
            performing a parameter collection dialog until values for all of the mandatory parameters are resolved, wherein the parameter collection dialog is performed based on one or more of the corresponding prompt messages for the mandatory parameters; and
            initiating performance of the action based on the values for all the mandatory parameters, after performing the parameter collection dialog.

2. The method of claim 1, further comprising:
   resolving an optional value, for one of the optional parameters, based on the recognized input;
   wherein, when it is determined that the values for all of the mandatory parameters are resolvable, initiating performance of the action based on the values for all the mandatory parameters, without initiating the parameter collection dialog, comprises:
      initiating performance of the action based on the optional value and the values for all the mandatory parameters.

3. The method of claim 2, further comprising:
   determining that no optional value, for an additional one of the optional parameters, is resolvable based on the recognized input;
   wherein, when it is determined that the values for all of the mandatory parameters are resolvable, initiating performance of the action based on the values for all the mandatory parameters, without initiating the parameter collection dialog, comprises:
      initiating performance of the action based on the optional value, the values for all the mandatory parameters, and without any value for the additional one of the optional parameters.

4. The method of claim 1, further comprising:
   determining that no optional value, for one of the optional parameters, is resolvable based on the recognized input;
   wherein, when it is determined that the values for all of the mandatory parameters are not resolvable, performing the parameter collection dialog until values for all of the mandatory parameters are resolved, comprises:
      resolving, during the parameter collection dialog, the values for all of the mandatory parameters without resolving any value for the one of the optional parameters; and
   wherein initiating performance of the action based on the values for all the mandatory parameters, after performing the parameter collection dialog, comprises:
      initiating performance of the action based on the values for all the mandatory parameters, but without any value for the one of the optional parameters.

5. The method of claim 1, wherein the corresponding system entities include one or more of: date references, time references, number references, and city references.

6. The method of claim 1, wherein the action is performed by the client device or by a server in communication with the client device.

7. The method of claim 6, wherein the action includes an Application Programming Interface (API) specific response.

8. A system comprising at least one processor and a memory storing processor-executable codes, wherein the at least one processor is configured to implement the following operations upon executing the processor-executable codes:
receive, via a platform interface, a plurality of instances of user interface input from a developer creating a dialog agent for a dialog system;
determine, based on the instances of user interface input:
at least one intent keyword that is a trigger for a dialog system intent of the dialog agent;
one or more system parameters, for the dialog system intent, that are each defined based on a corresponding system entity indicated by a corresponding one of the instances of user interface input, wherein the corresponding system entities are predefined for the dialog system;
one or more developer parameters, for the dialog system intent, that are each defined based on a corresponding developer entity, wherein the corresponding developer entities are each created by the developer through providing, via one or more corresponding ones of the instances of user interface input, one or more corresponding reference terms and one or more corresponding synonyms;
for each of the developer parameters and the system parameters, whether it is a mandatory parameter for the dialog system intent or an optional parameter for the dialog system intent; and
an action to be performed when the dialog system intent is triggered and values for at least the mandatory parameters are resolved, wherein the action is performed based on the resolved values;
associate the at least one intent keyword with triggering of the dialog system intent of the dialog agent, associating the dialog system intent with the action, and associating the developer parameters and the system parameters with the dialog system intent, and with an indication of whether they are mandatory or optional parameters;
subsequent to the associating:
receive a speech input provided via a dialog system interface of a client device, the dialog system interface being associated with the dialog system;
process the speech input, using an automatic speech recognizer, to generate a recognized input;
determine that the recognized input includes the at least one intent keyword that is the trigger for the dialog system intent of the dialog agent;
responsive to determining that the recognized input includes the at least one intent keyword that is the trigger for the dialog system intent of the dialog agent:
determine whether values for all of the mandatory parameters for the dialog system intent are all resolvable based on the recognized input, and without initiating a parameter collection dialog;
when it is determined that the values for all of the mandatory parameters are resolvable without initiating the parameter collection dialog:
initiate performance of the action based on the values for all the mandatory parameters, without initiating the parameter collection dialog;
when it is determined that values for all of the mandatory parameters are not resolvable without initiating the parameter collection dialog:
perform a parameter collection dialog until values for all of the mandatory parameters are resolved, wherein the parameter collection dialog solicits for input related to one of more of the unresolved mandatory parameters; and
initiating performance of the action based on the values for all the mandatory parameters, after performing the parameter collection dialog.

9. The system of claim 8, wherein the at least one processor is further configured to:
resolve an optional value, for one of the optional parameters, based on the recognized input;
wherein, when it is determined that the values for all of the mandatory parameters are resolvable, the at least one processor, in initiating performance of the action based on the values for all the mandatory parameters, without initiating the parameter collection dialog, is configured to:
initiate performance of the action based on the optional value and the values for all the mandatory parameters.

10. The system of claim 9, wherein the at least one processor is further configured to:
determine that no optional value, for an additional one of the optional parameters, is resolvable based on the recognized input;
wherein, when it is determined that the values for all of the mandatory parameters are resolvable, the at least one processor, in initiating performance of the action based on the values for all the mandatory parameters, without initiating the parameter collection dialog, is configured to:
initiate performance of the action based on the optional value, the values for all the mandatory parameters, and without any value for the additional one of the optional parameters.

11. The system of claim 8, wherein the at least one processor is further configured to:
determine that no optional value, for one of the optional parameters, is resolvable based on the recognized input;
wherein, when it is determined that the values for all of the mandatory parameters are not resolvable, the at least one processors, in performing the parameter collection dialog until values for all of the mandatory parameters are resolved, is configured to:
resolve, during the parameter collection dialog, the values for all of the mandatory parameters without resolving any value for the one of the optional parameters; and
wherein the at least one processor, in initiating performance of the action based on the values for all the mandatory parameters, after performing the parameter collection dialog, is configured to:
initiate performance of the action based on the values for all the mandatory parameters, but without any value for the one of the optional parameters.

12. The system of claim 8, wherein the corresponding system entities include one or more of: date references, time references, number references, and city references.

13. The system of claim 8, wherein the action is performed by the client device or by a server in communication with the client device.

14. The system of claim 13, wherein the action includes an Application Programming Interface (API) specific response.

15. A non-transitory processor-readable medium having instructions stored thereon, which when executed by one or more processors, cause the one or more processors to implement a method for a natural speech dialog system, the method comprising:

receiving, via a platform interface, a plurality of instances of user interface input from a developer creating a dialog agent for a dialog system;

determining, based on the instances of user interface input:

at least one intent keyword that is a trigger for a dialog system intent of the dialog agent;

one or more system parameters, for the dialog system intent, that are each defined based on a corresponding system entity indicated by a corresponding one of the instances of user interface input, wherein the corresponding system entities are predefined for the dialog system;

one or more developer parameters, for the dialog system intent, that are each defined based on a corresponding developer entity, wherein the corresponding developer entities are each created by the developer through providing, via one or more corresponding ones of the instances of user interface input, one or more corresponding reference terms and one or more corresponding synonyms;

for each of the developer parameters and the system parameters, whether it is a mandatory parameter for the dialog system intent or an optional parameter for the dialog system intent;

for each of the mandatory parameters, a corresponding prompt message; and an action to be performed when the dialog system intent is triggered and values for at least the mandatory parameters are resolved, wherein the action is performed based on the resolved values;

associating the at least one intent keyword with triggering of the dialog system intent of the dialog agent, associating the dialog system intent with the action, and associating the developer parameters and the system parameters with the dialog system intent, and with an indication of whether they are mandatory or optional parameters;

subsequent to the associating:

receiving a speech input provided via a dialog system interface of a client device, the dialog system interface being associated with the dialog system;

processing the speech input, using an automatic speech recognizer, to generate a recognized input;

determining that the recognized input includes the at least one intent keyword that is the trigger for the dialog system intent of the dialog agent;

responsive to determining that the recognized input includes the at least one intent keyword that is the trigger for the dialog system intent of the dialog agent:

determining whether values for all of the mandatory parameters for the dialog system intent are all resolvable based on the recognized input, and without initiating a parameter collection dialog;

when it is determined that the values for all of the mandatory parameters are resolvable without initiating the parameter collection dialog:

initiating performance of the action based on the values for all the mandatory parameters, without initiating the parameter collection dialog;

when it is determined that values for all of the mandatory parameters are not resolvable without initiating the parameter collection dialog:

performing a parameter collection dialog until values for all of the mandatory parameters are resolved, wherein the parameter collection dialog is performed based on one or more of the corresponding prompt messages for the mandatory parameters; and initiating performance of the action based on the values for all the mandatory parameters, after performing the parameter collection dialog.

* * * * *